US008963766B2

(12) United States Patent
Furukawa

(10) Patent No.: US 8,963,766 B2
(45) Date of Patent: Feb. 24, 2015

(54) TARGET TRACKING SYSTEM AND METHOD USING DATA OF ANGLE SENSORS

(75) Inventor: Hidetoshi Furukawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 13/488,788

(22) Filed: Jun. 5, 2012

(65) Prior Publication Data

US 2013/0050014 A1 Feb. 28, 2013

(30) Foreign Application Priority Data

Aug. 29, 2011 (JP) ................................. 2011-186578

(51) Int. Cl.
| | | |
|---|---|---|
| *G01S 13/72* | (2006.01) | |
| *G01S 5/04* | (2006.01) | |
| *G01S 5/00* | (2006.01) | |
| *G01S 5/02* | (2010.01) | |
| *G01S 5/16* | (2006.01) | |
| *G01S 5/18* | (2006.01) | |
| *G01S 5/20* | (2006.01) | |
| *G01S 13/00* | (2006.01) | |

(52) U.S. Cl.
CPC ... *G01S 5/04* (2013.01); *G01S 5/00* (2013.01); *G01S 5/0294* (2013.01); *G01S 5/16* (2013.01); *G01S 5/18* (2013.01); *G01S 5/20* (2013.01)
USPC ............. 342/95; 235/400; 235/411; 235/412; 235/413; 382/100; 382/103; 342/73; 342/89; 342/94; 342/104; 342/107; 342/108; 342/109; 342/113; 342/115; 342/118; 342/145; 342/146; 342/147; 342/175; 342/195

(58) Field of Classification Search
USPC .................. 244/3.1–3.19; 235/400, 404–417; 367/87–105, 117; 342/59, 61–67, 342/73–82, 89–103, 104, 106–108, 115, 342/118, 145–157, 175, 195, 350, 351, 342/369–384, 450–465, 113; 382/100, 103, 382/106, 107; 701/400, 408, 519, 300; 89/1.11

See application file for complete search history.

(56) References Cited

U.S. PATENT DOCUMENTS 3,135,053 A * 6/1964 Newman et al. ............... 235/412
3,795,911 A * 3/1974 Hammack .................... 342/106
(Continued)

FOREIGN PATENT DOCUMENTS

JP 10-142325 5/1998

OTHER PUBLICATIONS

U.S. Appl. No. 13/613,787, filed Sep. 13, 2012, Furukawa.
(Continued)

*Primary Examiner* — Bernarr Gregory
(74) *Attorney, Agent, or Firm* — Oblon, Spivak, McClelland, Maier & Neustadt, L.L.P.

(57) ABSTRACT

According to one embodiment, a target tracking apparatus calculates N-dimensional predicted values from a respective stored (N+1)-dimensional tracks for each of the targets, determines whether or not the N-dimensional predicted value for each of the targets is correlated with the received N-dimensional angle observed value for the target, if the N-dimensional predicted value is not correlated, generates a new (N+1)-dimensional track for the target based on the N-dimensional track corresponding to the N-dimensional angle observed value and if the N-dimensional predicted value is correlated, updates and stores the (N+1)-dimensional track using the N-dimensional angle observed value.

9 Claims, 3 Drawing Sheets

(56) References Cited

U.S. PATENT DOCUMENTS

| | | | | |
|---|---|---|---|---|
| 3,866,229 | A | * | 2/1975 | Hammack ............... 701/300 |
| 3,952,304 | A | * | 4/1976 | Broniwitz et al. ........... 342/95 |
| 3,996,590 | A | * | 12/1976 | Hammack ............... 342/107 |
| 4,128,837 | A | * | 12/1978 | Page ..................... 342/67 |
| 4,179,696 | A | * | 12/1979 | Quesinberry et al. ....... 342/75 |
| 4,760,397 | A | * | 7/1988 | Piccolruaz ............... 342/75 |
| 4,959,800 | A | * | 9/1990 | Woolley ................. 235/411 |
| 5,192,955 | A | * | 3/1993 | Hoang .................... 342/80 |
| 5,285,273 | A | * | 2/1994 | James et al. ............. 382/103 |
| 5,381,156 | A | * | 1/1995 | Bock et al. ............... 342/59 |
| 5,604,683 | A | * | 2/1997 | Roecker ................. 342/378 |
| 6,204,804 | B1 | * | 3/2001 | Andersson ............... 342/115 |
| 6,672,533 | B1 | * | 1/2004 | Regebro ................. 244/3.19 |
| 6,870,793 | B2 | * | 3/2005 | Ishihara et al. ............ 367/104 |
| 6,956,523 | B2 | * | 10/2005 | Mohan ................... 342/195 |
| 7,965,867 | B2 | * | 6/2011 | Lanz ..................... 382/103 |
| 8,681,041 | B2 | * | 3/2014 | Rojas et al. ............... 342/95 |

OTHER PUBLICATIONS

Masayoshi Ito, et al., "Tracking a 3-Dimensional Moving Target with Distributed Passive Sensors using Extended Kalman Filter", Treatise Collection B by the Institute of Electronics, Information and Communication Engineers (IEICE), vol. J82-B, No. 5, May 1999, pp. 1063-1072.

Masayoshi Ito, et al , "A Target Correlation Algorithm between 2-Dimensional Angle Sensors", Treatise Collection B2 by the Institute of Electronics, Information and Communication Engineers (IEICE), vol. J81-B2, No. 2, Feb. 1998. pp. 162-168.

S.S. Blackman, "Association and fusion of multiple sensor data", Multitarget-Multisensor Tracking: Advanced Applications, Artech House, Chapter 6.7.2, 1990, 7 pages.

* cited by examiner

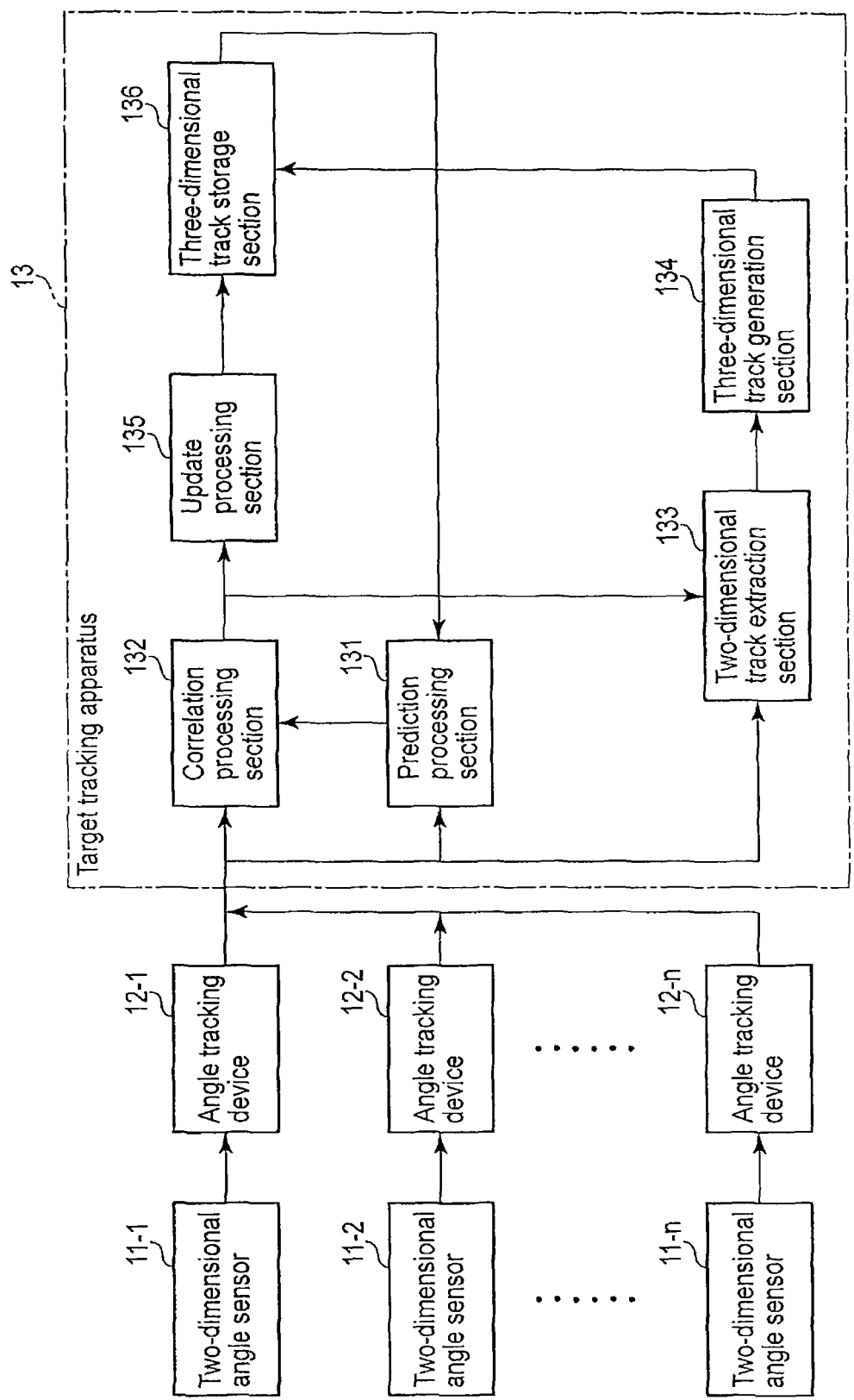
F I G. 1

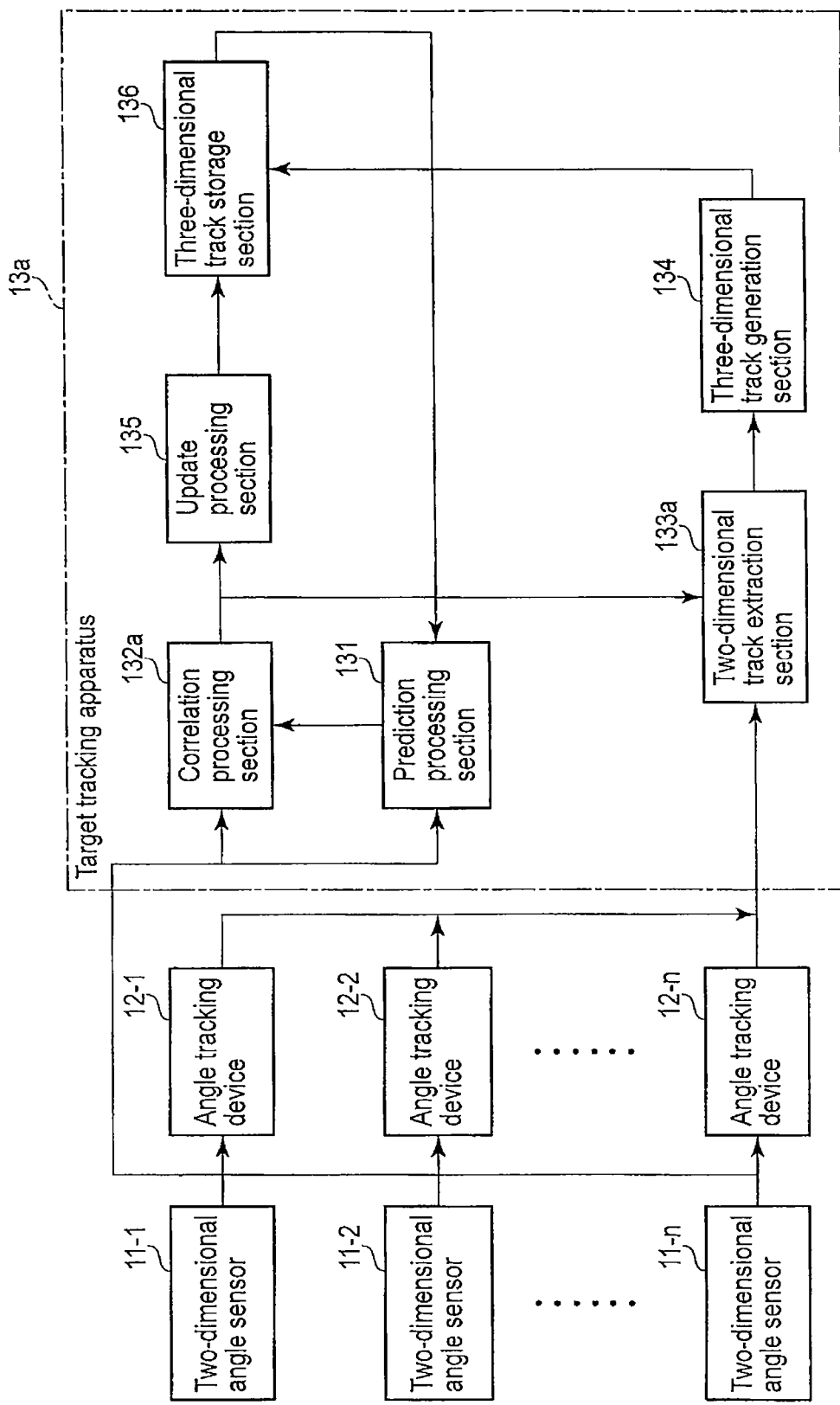
F I G. 4

TARGET TRACKING SYSTEM AND METHOD USING DATA OF ANGLE SENSORS

CROSS-REFERENCE TO RELATED APPLICATIONS

This application is based upon and claims the benefit of priority from prior Japanese Patent Application No. 2011-186578, filed Aug. 29, 2011, the entire contents of which are incorporated herein by reference.

FIELD

Embodiments described herein relate generally to a target tracking system which integrates information from a plurality of N-dimensional angle sensors each monitoring the angle of a target and which calculates and adds distance information to the integrated information from the N-dimensional angle sensors to generate (N+1)-dimensional tracks for the targets, as well as an angle tracking apparatus and a target tracking apparatus for use in the target tracking system, storage media that store programs for the target tracking system, the angle tracking apparatus, and the target tracking apparatus, and a target tracking method and an angle tracking method.

BACKGROUND

For target tracking systems, processing has been proposed which determines which of four combinations of two-dimensional tracks corresponds to the real target (not ghost) if two targets are tracked by integrating information from two two-dimensional angle sensors together. Moreover, a system has been examined which determines which of $(n \cdot (n-1)/2) \cdot m^2$ combinations of two-dimensional tracks corresponds to the real target if m targets are tracked by integrating information from n two-dimensional angle sensors together.

However, in such a conventional target tracking system as described above, the number of combinations increases generally in accordance with a square relationship with the number of processable targets m or the number of two-dimensional angle sensors n. Thus, disadvantageously, apparatus scale and processing time increase when requests are made for an increase in the number of processable targets or the number of two-dimensional angle sensors in order to improve accuracy.

BRIEF DESCRIPTION OF THE DRAWINGS

FIG. 1 is a block diagram showing a configuration of a target tracking system according to the present embodiment;

FIG. 4 is a block diagram showing a modification of the target tracking system according to the present embodiment.

DETAILED DESCRIPTION

Figure 3:
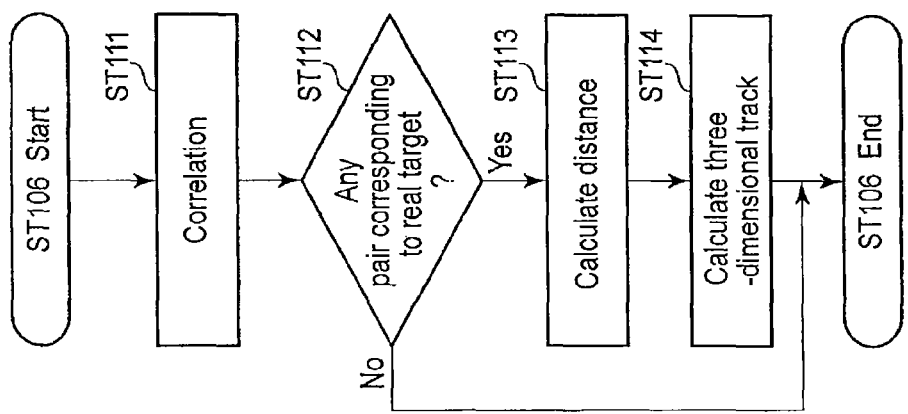
FIG. 3 is a flowchart specifically showing a flow of processing in the generation of a three-dimensional track shown in FIG. 2.

In general, according to one embodiment, a target tracking system according to the present embodiment will be described below with reference to the drawings.

First Embodiment

FIG. 1 is a block diagram showing a configuration of a target tracking system according to a first embodiment. The target tracking system comprises n two-dimensional angle sensors 11-1 to 11-$n$ each of which tracks the angle of the corresponding target by monitoring a target two-dimensional angle, n angle tracking apparatuses 12-1 to 12-$n$ each of which calculates a target two-dimensional track from a two-dimensional angle observed value (hereinafter simply referred to as a two-dimensional observed value) obtained by the corresponding one of the two-dimensional angle sensors 11-1 to 11-$n$, and a target tracking apparatus 13 that tracks each of the targets by generating and a three-dimensional track for the target from angle track information on the target obtained by the corresponding one of the angle tracking apparatuses 12-1 to 12-$n$ and maintaining the three-dimensional track.

Each of the angle tracking apparatuses 12-1 to 12-$n$ has a pairing function to pair the two-dimensional observed value from the corresponding one of the two-dimensional angle sensors 11-1 to 11-$n$ with a two-dimensional track calculated using the observed value and to output the resulting angle tracking information to the target tracking device 13.

In the target tracking system configured as described above, the target tracking apparatus 13 calculates distance information from the angle tracking information and adds the distance information to the angle tracking information to generate and maintain three-dimensional information. The target tracking information 13 comprises a prediction processing section 131, a correlation processing section 132, a two-dimensional track extraction section 133, a three-dimensional track generation section 134, an update processing section 135, and a three-dimensional track storage section 136.

Upon receiving the angle tracking information, the prediction processing section 131 calculates a two-dimensional predicted value from the two-dimensional observed value included in the angle tracking information and the three-dimensional track stored in the three-dimensional track storage section 136.

The correlation processing section 132 extracts the two-dimensional observed value from the angle tracking information and determines whether or not the two-dimensional observed value is correlated with the two-dimensional predicted value calculated by the prediction processing section 131.

If the correlation processing section 132 determines that the two-dimensional predicted value is not correlated with the two-dimensional observed value, the two-dimensional track extraction section 133 extracts the two-dimensional track paired with the two-dimensional observed value determined not to correlate with the two-dimensional predicted value based on the angle tracking information.

The three-dimensional track generation section 134 generates a new three-dimensional track based on the two-dimensional track extracted by the two-dimensional track extraction section 133. The three-dimensional track thus generated is stored in the three-dimensional track storage section 136.

If the correlation processing section 132 determines that the two-dimensional predicted value is correlated with the two-dimensional observed value, the update processing section 135 receives, from the correlation processing section 132, the two-dimensional observed value determined to correlate with the two-dimensional predicted value, and based on the two-dimensional observed value, updates the three-dimensional track stored in the three-dimensional track storage section 136 and corresponding to the two-dimensional predicted value.

Now, the contents of processing by the target tracking apparatus 13 will be described in brief taking the case of the use of an extended Kalman filter as an example. The processing below is carried out for each target. However, here, to avoid complicated description, symbols that distinguish the targets from one another are not used.

First, the extended Kalman filter uses the following kinetic model and observation model.

$$x(k)=F(k)\times(k-1)+G(k)w(k-1) \quad (1)$$

$$y(k,i)=h(x(k),i)+v(k,i) \quad (2)$$

Here, x(k) denotes a target state vector obtained at an observation time $t_k$, F(k) and G(k) denote a transition matrix and a driving matrix, respectively, which are obtained between observation times $t_{k-1}$ and $t_k$, w(k−1) denotes a system noise vector conforming to a normal distribution of a covariance matrix Q(k−1) with an average of zero at the observation time $t_{k-1}$, y(k, i) denotes an observed vector obtained by an angle sensor $S_i$ at the observation time $t_k$, h(•) denotes an observation function, and v(k, i) denotes an observed noise vector conforming to a normal distribution of a covariance matrix R(k, i) with an average of zero at the observation time $t_k$.

The prediction processing section 131 calculates values represented by:

$$x(k|k-1)=F(k)\times(k-1|k-1) \quad (3)$$

$$P(k|k-1)=F(k)P(k-1|k-1)F(k)^T+G(k)Q(k-1)G(k)^T \quad (4)$$

$$y(k|k-1,i)=h(x(k|k-1),i) \quad (5)$$

Here, x(k|k−1) and P(k|k−1) are a predicted vector and a predicted error covariance matrix obtained at the observation time $t_k$, x(k−1|k−1) and P(k−1|k−1) denote an updated vector and an updated error covariance matrix obtained at the observation time $t_{k-1}$, and y(k|k−1, i) denotes a predicted position vector for the angle sensor $S_i$ obtained at the observation time $t_k$. Furthermore, $A^T$ denotes a transposition of a matrix A. The updated vector x(k−1|k−1) corresponds to a maintained three-dimensional track. The predicted position vector y(k|k−1, i) corresponds to a two-dimensional predicted value.

In the above description, the "three-dimensional track" means a track in a three-dimensional space. In the phrase "updated vector . . . corresponds to a three-dimensional track", the degree (sometimes also referred to as the dimension) of the updated vector may of course be increased above 3 by addition of a speed component or an acceleration component.

The correlation processing section 132 carries out calculations, as correlation processing, of values represented by:

$$S(k)=H(k,i)P(k|k-1)H(k,i)^T+R(k,i) \quad (6)$$

$$d(k)^2=(y(k,i)-y(k|k-1,i))^T S(k)^{-1}(y(k,i)-y(k|k-1,i)) \quad (7)$$

Here, S(k) and d(k) denote a residual covariance matrix and a Mahalanobis distance, respectively, which are observed at the observation time $t_k$. Furthermore, $A^{-1}$ denotes an inverse matrix. If the Mahalanobis distance (or the Mahalanobis square distance) is smaller than a reference value, the correlation processing section 135 determines that the two-dimensional observed value is correlated with two-dimensional predicted value. At this time, the update processing section 135 carries out calculations, as update processing, of values represented by:

$$K(k)=P(k|k-1)H(k,i)^T S(k)^{-1} \quad (8)$$

$$x(k|k)=x(k|k-1)+K(k)(y(k,i)-y(k|k-1,i)) \quad (9)$$

$$P(k|k)=(I-K(k)H(k,i))P(k|k-1) \quad (10)$$

Here, K(k) denotes a Kalman gain matrix obtained at the observation time $t_k$, x(k|k) and P(k|k) denote an updated vector and an updated error covariance matrix, respectively, which are obtained at the observation time $t_k$. Additionally, I denotes an identity matrix (or an unit matrix).

Furthermore, if the Mahalanobis distance (or the Mahalanobis square distance) is greater than the reference value, the correlation processing section 132 determines that the two-dimensional observed value is not correlated with two-dimensional predicted value. At this time, the two-dimensional track extraction section 133 extracts, from the angle tracking information, the two-dimensional track paired with the two-dimensional observed value determined that there is not correlation with the two-dimensional predicted value. The two-dimensional track extraction section 133 then outputs the two-dimensional track to the three-dimensional track generation section 134.

Figure 2:
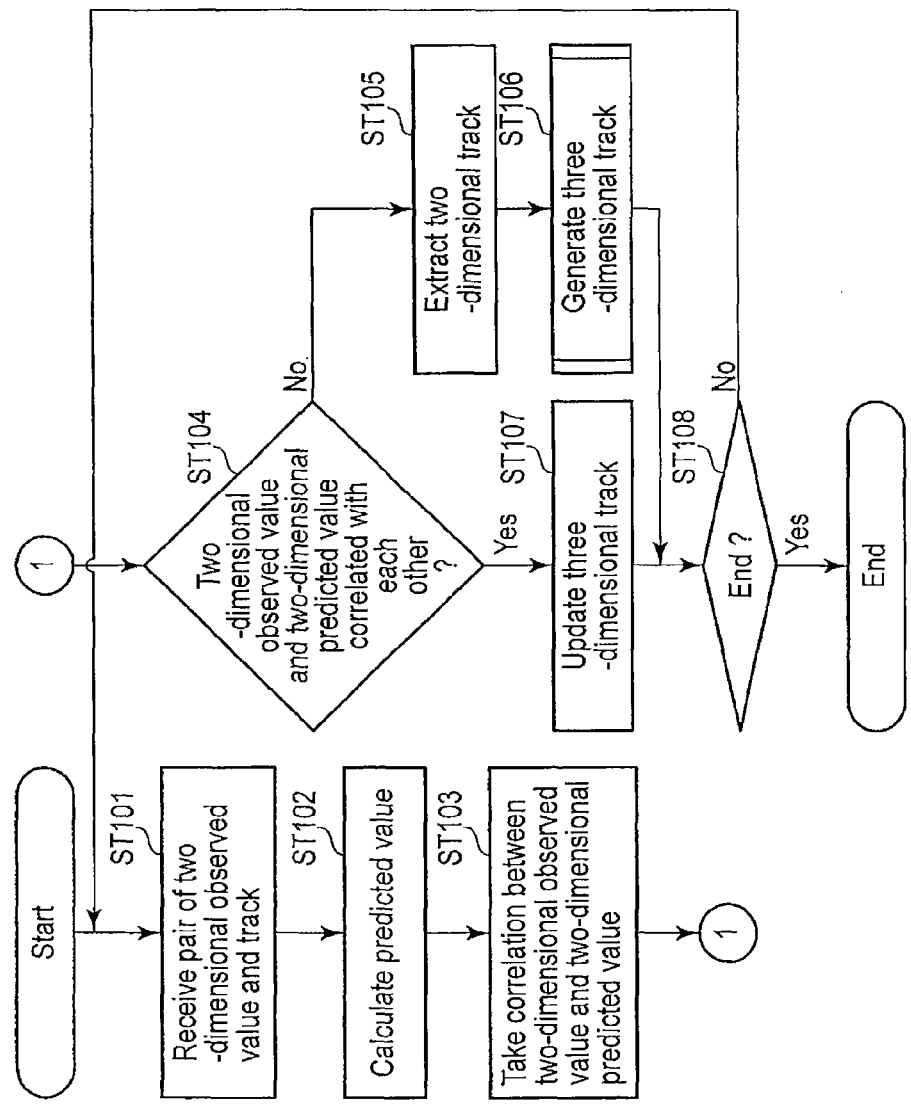
FIG. 2 is a flowchart showing a flow of processing by a target tracking apparatus shown in FIG. 1.

Now, a flow of processing by the target tracking apparatus 13 according to the first embodiment will be described with reference to FIG. 2.

Each of the angle tracking apparatuses 12-1 to 12-n inputs angle tracking information that is a pair of a two-dimensional observed value and a two-dimensional track to the target tracking apparatus 13 (step ST101). The prediction processing section 131 calculates a two-dimensional predicted value from the three-dimensional track stored in the three-dimensional track storage section 136 (step ST102). Then, the correlation processing section 132 takes the correlation between the two-dimensional predicted value from the prediction processing section 131 and the input two-dimensional observed value (step ST103). The correlation processing section 132 thus determines whether or not the two-dimensional predicted value is correlated with the two-dimensional observed value (step ST104).

If as a result of the correlation determination in step ST104, the correlation processing section 132 determines that the two-dimensional predicted value is not correlated with the two-dimensional observed value (NO), the two-dimensional track extraction section 133 extracts, from the input angle track information, the two-dimensional track paired with the two-dimensional observed value determined not to correlate with the two-dimensional predicted value based on the input angle track information (step ST105). Then, the three-dimensional track generation section 134 generates a new three-dimensional track based on a two-dimensional track from a different angle tracking apparatus which is extracted by the two-dimensional track extraction section 133, and stores the three-dimensional track in the three-dimensional track storage section 136 (step ST106).

On the other hand, if as a result of the correlation determination in step ST104, the correlation processing section 132 determines that the two-dimensional predicted value is correlated with the two-dimensional observed value (YES), the update processing section 135 uses the two-dimensional observed value determined to correlate with the two-dimensional predicted value to update the three-dimensional track stored in the three-dimensional track storage section 136 and corresponding to the two-dimensional predicted value (step ST107). Thereafter, the above-described operation steps starting with step ST101 are repeated until an instruction to stop the operation is given (step ST108).

Now, a flow of the three-dimensional track generation process in step ST106 will be described with reference to FIG. 3.

The three-dimensional track generation section 134 creates combinations of two-dimensional tracks based on the two-dimensional tracks from the different angle tracking apparatuses 12-1 to 12-n extracted by the two-dimensional track extraction section 133, and determines whether or not each of the combinations of two-dimensional tracks corresponds to the real target (not ghost) (step S111). If as a result of the correlation determination in step ST111, any combination of two-dimensional tracks is found to correspond to the real target (YES), the three-dimensional track generation section 134 uses the combination of two-dimensional tracks corresponding to the real target to calculate a distance and a distance change rate (step ST113). When the distance and the distance change rate are calculated in step ST113, the three-dimensional track generation section 134 combines the distance and distance change rate calculated for the two-dimensional tracks to calculate a three-dimensional track (step ST114). The three-dimensional track generation section 134 then ends the process of generating a three-dimensional track (step ST106). Furthermore, if in step ST112, no combination of two-dimensional is found to correspond to the real target (NO), the three-dimensional track generation section 134 performs no operation and ends the process of generating a three-dimensional track (step ST106).

The above-described process of generating a three-dimensional track may be the same as target tracking apparatuses described in Patent Document 1 and Non-Patent Documents 1 to 3 except that two-dimensional tracks from different angle tracking apparatuses which are extracted by the two-dimensional track extraction section 133 are used.

That is, if the target tracking apparatuses in the above described documents track m targets by integrating information from n two-dimensional angle sensors, the target tracking apparatuses need to determine which of $(n\cdot(n-1)/2)\cdot m^2$ combinations of two-dimensional tracks corresponds to the real target. Thus, the number of combinations of two-dimensional tracks increases generally in accordance with a square relationship with the number of two-dimensional angle sensors n or the number of targets m.

In contrast, the target tracking apparatus 13 according to the first embodiment tracks m targets by integrating information from n two-dimensional angle sensors 11-1 to 11-$n$. In this case, when the difference between the number of targets m and the number of tracks (targets) maintained is denoted by $\Delta m$, the target tracking apparatus 13 may determine which of $(n\cdot(n-1)/2)\cdot(\Delta m)^2$ combinations of two-dimensional tracks corresponds to the real target. This enables a substantial reduction in the number of combinations of two-dimensional tracks. Furthermore, where the number of tracks m remains unchanged, $\Delta m$ eventually results in zero, and the number of combinations of two-dimensional tracks can be reduced to zero even if three-dimensional tracks are generated and maintained for the m targets. As a result, the first embodiment can reduce the scale of the target tracking apparatus and the processing time.

Second Embodiment

FIG. 4 is a block diagram showing a configuration of a target tracking system according to a second embodiment. In the description of FIG. 4, the same components as those in FIG. 1 are denoted by the same reference numerals. Now, only components different from those in FIG. 1 will be described.

In the first embodiment, each of the angle tracking apparatuses 12-1 to 12-$n$ inputs a pair of a two-dimensional observed value from the corresponding one of the two-dimensional angle sensors 11-1 to 11-$n$ and a two-dimensional track calculated from the observed value to the target tracking apparatus 13 as angle track information. In contrast, in the second embodiment, each of the angle tracking apparatuses 12-1 to 12-$n$ calculates a two-dimensional track from a two-dimensional observed value from the corresponding one of the two-dimensional angle sensors 11-1 to 11-$n$, adds identification information on the two-dimensional observed value, which is the basis for the above-described calculation, to the two-dimensional track, and outputs the resultant two-dimensional track.

That is, in the target tracking apparatus 13a, a two-dimensional observed value from each of the two-dimensional angle sensors 11-1 to 11-$n$ is input directly to the correlation processing section 132a, and a two-dimensional track from each of the angle tracking apparatuses 12-1 to 12-$n$ to which information indicative of correspondence to the two-dimensional observed value is added is input directly to the two-dimensional track extraction section 133a. In this case, the correlation processing section 132a takes the correlation between the two-dimensional observed value from each of the two-dimensional angle sensor 11-1 to 11-$n$ and a corresponding two-dimensional predicted value. Upon determining that the two-dimensional observed value is not correlated with the two-dimensional predicted value, the correlation processing section 132a transmits identification information on the two-dimensional observed value to the two-dimensional track extraction section 133a. The two-dimensional track extraction section 133a receives the two-dimensional track from each of the angle tracking apparatuses 12-1 to 12-$n$, and extracts two-dimensional tracks with the same identification information on the two-dimensional observed value from the correlation processing section 132a.

Thus, even the target tracking apparatus 13a modified as described above enables a significant reduction in the number of combinations of two-dimensional tracks and also a reduction in the scale of the apparatus and in processing time.

In the above-described first and second embodiments, the angle tracking apparatuses 12-1 to 12-$n$ are associated with the two-dimensional angle sensors 11-1 to 11-$n$, respectively. However, each of the angle tracking apparatuses 12-1 to 12-$n$ may be associated with a plurality of two-dimensional angle sensors.

In the above-described embodiments, three-dimensional tracks of the targets are generated from angle information from the two-dimensional angle sensors 11-1 to 11-$n$ and maintained and updated. However, (N+1)-dimensional tracks of the targets may be generated from information from N-dimensional (N is 1 or 2) angle sensors and maintained and updated. Image sensors, sonar devices, passive radar devices, and the like are available as the N-dimensional angle sensors.

While certain embodiments have been described, these embodiments have been presented by way of only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A target tracking system, comprising:
a plurality of N-dimensional angle sensors configured to observe targets and to obtain N-dimensional angle observed values;
angle tracking apparatuses provided in association with the plurality of N-dimensional angle sensors and configured to calculate N-dimensional tracks for the respective tar- gets by angle tracking using the N-dimensional angle observed values for the respective targets obtained by the corresponding sensors;

(N+1)-dimensional track processing means for receiving, as input information, N-dimensional angle observed values for the respective targets observed by the corresponding plurality of N-dimensional angle sensors and N-dimensional tracks for the respective targets calculated from the corresponding N-dimensional angle observed values for the corresponding targets to calculate distance information from the input information, adding the distance information to the input information, and generating and maintaining (N+1)-dimensional tracks for the respective targets;

predicted value calculation means for calculating N-dimensional predicted values from the respective maintained (N+1)-dimensional tracks for the corresponding targets; and correlation determination means for determining whether or not the N-dimensional predicted value for each of the targets obtained by the predicted value calculation means is correlated with the N-dimensional angle observed value for the target, wherein if the correlation determination means determines that the N-dimensional predicted value is not correlated with the N-dimensional angle observed value, the (N+1)-dimensional track processing means generates a new (N+1)-dimensional track for the target based on the N-dimensional track corresponding to the N-dimensional angle observed value determined not to correlate with the N-dimensional predicted value, wherein if the correlation determination means determines that the N-dimensional predicted value is correlated with the N-dimensional angle observed value, the (N+1)-dimensional track processing means updates and maintains the (N+1)-dimensional track maintained in association with the N-dimensional predicted value using the N-dimensional angle observed value determined to correlate with the N-dimensional predicted value, and wherein N is an integer equal to 1 or 2.

2. The target tracking system according to claim 1, further comprising:

at least one angle tracking apparatus, comprising:

a calculation device configured to receive the N-dimensional angle observed value for each of the targets from the corresponding N-dimensional angle sensor to calculate an N-dimensional track from the N-dimensional angle observed value by angle tracking; and a pairing device configured to pair the received N-dimensional angle observed value for the target with the N-dimensional track calculated from the observed value and to output the paired N-dimensional angle observed value and N-dimensional track.

3. A non-transitory computer readable storage medium encoded with a target tracking program, which when executed, causes a computer to carry out a target tracking process, comprising:

performing (N+1)-dimensional track processing of receiving N-dimensional angle observed values for respective targets observed by a corresponding plurality of N-dimensional angle sensors;

calculating N-dimensional tracks for the respective targets by angle tracking using the N-dimensional angle observed values for the respective targets obtained by the corresponding sensors;

calculating distance information based on the N-dimensional angle observed values for the respective targets obtained by the corresponding sensors;

adding the calculated distance information to the N-dimensional angle observed values and the N-dimensional tracks to generate and maintain (N+1)-dimensional tracks for the respective targets;

performing predicted value calculation processing of calculating N-dimensional predicted values from the respective maintained (N+1)-dimensional tracks for the respective targets; and performing correlation determination processing of determining whether or not the N-dimensional predicted value for each of the respective targets obtained by the predicted value calculation process is correlated with the received N-dimensional angle observed value for each of the respective targets, wherein the (N+1)-dimensional track processing comprises:

generation processing in which if the correlation determination processing determines that the N-dimensional predicted value is not correlated with the N-dimensional angle observed value, a new (N+1)-dimensional track for the target is generated based on the N-dimensional track corresponding to the N-dimensional angle observed value determined not to correlate with the N-dimensional predicted value; and update processing in which if the correlation determination processing determines that the N-dimensional predicted value is correlated with the N-dimensional angle observed value, the (N+1)-dimensional track maintained in association with the N-dimensional predicted value is updated and maintained using the N-dimensional angle observed value determined to correlate with the N-dimensional predicted value, wherein N is an integer equal to 1 or 2.

4. The non-transitory computer readable storage medium of claim 3, wherein an angle tracking processing comprises:

calculation processing of receiving the N-dimensional angle observed value for each of the respective targets from the corresponding N-dimensional angle sensor to calculate an N-dimensional track from the N-dimensional angle observed value by angle tracking; and pairing processing of pairing the received N-dimensional angle observed value for the target with the N-dimensional track calculated from the observed value and outputting the paired N-dimensional angle observed value and N-dimensional track.

5. A target tracking method, comprising:

receiving N-dimensional angle observed values for respective targets observed and obtained by a corresponding plurality of N-dimensional angle sensors;

calculating N-dimensional tracks for the respective targets by angle tracking using the N-dimensional angle observed values for the respective targets obtained by the corresponding sensors;

calculating distance information based on the N-dimensional angle observed values for the respective targets obtained by the corresponding sensors;

adding the calculated distance information to the N-dimensional angle observed values and the N-dimensional tracks to generate and maintain (N+1)-dimensional tracks for the respective targets;

calculating N-dimensional predicted values from the respective maintained (N+1)-dimensional tracks for the respective targets;

determining whether or not the N-dimensional predicted value for each of the respective targets is correlated with the received N-dimensional angle observed value for each of the respective targets, wherein if the correlation determination determines that the N-dimensional predicted value is not correlated with the N-dimensional angle observed value, generating a new (N+1)-dimensional track for the target based on the N-dimensional track corresponding to the N-dimensional angle observed value determined not to correlate with the N-dimensional predicted value, wherein if the correlation determination determines that the N-dimensional predicted value is correlated with the N-dimensional angle observed value, updating and maintaining the (N+1)-dimensional track maintained in association with the N-dimensional predicted value using the N-dimensional angle observed value determined to correlate with the N-dimensional predicted value, and wherein N is an integer equal to 1 or 2.

6. The target tracking method according to claim 5, further comprising:

receiving the N-dimensional angle observed value for each of the targets from the corresponding N-dimensional angle sensor to calculate an N-dimensional track from the N-dimensional angle observed value by angle tracking; and pairing the received N-dimensional angle observed value for the target with the N-dimensional track calculated from the observed value and outputting the paired N-dimensional angle observed value and N-dimensional track.

7. A target tracking apparatus comprising:

an (N+1)-dimensional track processing device configured to:

receive N-dimensional angle observed values for respective targets observed by a corresponding plurality of N-dimensional angle sensors and N-dimensional tracks for the respective targets calculated from the N-dimensional angle observed values for the respective targets, calculate and add distance information to the N-dimensional angle observed values and the N-dimensional tracks to generate and maintain (N+1)-dimensional tracks for the respective targets;

a predicted value calculation device configured to calculate N-dimensional predicted values from the respective maintained (N+1)-dimensional tracks for the respective targets; and a correlation determination device configured to determine whether or not the N-dimensional predicted value for each of the respective targets obtained by the predicted value calculation device is correlated with the N-dimensional angle observed value for each of the respective targets, wherein if the correlation determination device determines that the N-dimensional predicted value is not correlated with the N-dimensional angle observed value, the (N+1)-dimensional track processing device generates a new (N+1)-dimensional track for the target based on the N-dimensional track corresponding to the N-dimensional angle observed value determined not to correlate with the N-dimensional predicted value, wherein if the correlation determination device determines that the N-dimensional predicted value is correlated with the N-dimensional angle observed value, the (N+1)-dimensional track processing device updates and maintains the (N+1)-dimensional track maintained in association with the N-dimensional predicted value using the N-dimensional angle observed value determined to correlate with the N-dimensional predicted value, and wherein N is an integer equal to 1 or 2.

8. A non-transitory computer readable storage medium encoded with a target tracking program, which when executed, causes a computer to carry out a target tracking process, comprising:

performing (N+1)-dimensional track processing of receiving N-dimensional angle observed values for respective targets observed by a corresponding plurality of N-dimensional angle sensors and N-dimensional tracks for the respective targets calculated from the N-dimensional angle observed values for the respective targets;

calculating and adding distance information to the N-dimensional angle observed values and the N-dimensional tracks to generate and maintain (N+1)-dimensional tracks for the respective targets;

performing predicted value calculation processing of calculating N-dimensional predicted values from the respective maintained (N+1)-dimensional tracks for the respective targets; and performing correlation determination processing of determining whether or not the N-dimensional predicted value for each of the respective targets obtained by the predicted value calculation process is correlated with the received N-dimensional angle observed value for the target, wherein the (N+1)-dimensional track processing comprises:

generation processing in which if the correlation determination processing determines that the N-dimensional predicted value is not correlated with the N-dimensional angle observed value, a new (N+1)-dimensional track for the target is generated based on the N-dimensional track corresponding to the N-dimensional angle observed value determined not to correlate with the N-dimensional predicted value; and update processing in which if the correlation determination processing determines that the N-dimensional predicted value is correlated with the N-dimensional angle observed value, the (N+1)-dimensional track maintained in association with the N-dimensional predicted value is updated and maintained using the N-dimensional angle observed value determined to correlate with the N-dimensional predicted value, wherein N is an integer equal to 1 or 2.

9. A target tracking method, comprising:

receiving N-dimensional angle observed values for respective targets observed and obtained by a corresponding plurality of N-dimensional angle sensors and N-dimensional tracks for the respective targets calculated from the N-dimensional angle observed values for the respective targets;

calculating and adding distance information to the N-dimensional angle observed values and the N-dimensional tracks to generate and maintain (N+1)-dimensional tracks for the respective targets;

calculating N-dimensional predicted values from the respective maintained (N+1)-dimensional tracks for the respective targets;

determining whether or not the N-dimensional predicted value for each of the respective targets is correlated with the received N-dimensional angle observed value for each of the respective targets, wherein if the correlation determination determines that the N-dimensional predicted value is not correlated with the N-dimensional angle observed value, generating a new (N+1)-dimensional track for the target based on the N-dimensional track corresponding to the N-dimensional angle observed value determined not to correlate with the N-dimensional predicted value, wherein if the correlation determination determines that the N-dimensional predicted value is correlated with the N-dimensional angle observed value, updating and maintaining the (N+1)-dimensional track maintained in association with the N-dimensional predicted value using the N-dimensional angle observed value determined to correlate with the N-dimensional predicted value, and wherein N is an integer equal to 1 or 2.

* * * * *